United States Patent [19]

Axford

[11] 4,002,416
[45] Jan. 11, 1977

[54] MOTOR POWERED BY WAVE ACTION

[76] Inventor: Roy Morgan Axford, No. 5 Ringbit, Rolling Hills, Calif. 90274

[22] Filed: Jan. 15, 1976

[21] Appl. No.: 649,269

[52] U.S. Cl. .................................. 417/330; 60/398; 185/30; 290/53
[51] Int. Cl.[2] ......................................... F04B 35/00
[58] Field of Search ............ 60/398, 325, 716, 497, 60/501; 185/30, 33; 290/53; 415/2; 416/6; 417/330

[56] References Cited
UNITED STATES PATENTS

| | | | |
|---|---|---|---|
| 686,602 | 11/1901 | Gehre | 185/30 |
| 1,061,091 | 5/1913 | Lewis | 417/330 X |
| 1,624,349 | 4/1927 | Mann et al. | 416/6 |
| 3,664,125 | 5/1972 | Strange | 60/398 X |

*Primary Examiner*—Edgar W. Geoghegan
*Attorney, Agent, or Firm*—Dominick Nardelli

[57] ABSTRACT

A motor, preferably in the form of a pump, is primarily designed to be activated by the oscillating motion of waves and has a paddle disposed to oscillate about a stationary horizontal axis located in the plane of the paddle. The paddle is placed in the surf and so positioned where the wave action is greatest so that the force of the waves can act on the paddle to cause the paddle to oscillate back and forth, one cycle with each wave. Preferably, the paddle is disposed to depend from the stationary axis. This oscillating motion of the paddle is coupled to a suitable pump which pumps sea water. Preferably, the pump has a cylindrical housing concentric with the stationary axis. A radial vane is fixed to a shaft within the housing while the paddle is fixed to the shaft and disposed outside the housing. Suitable valves are provided in the housing to allow sea water to enter and exit under action of the oscillating vane.

6 Claims, 6 Drawing Figures

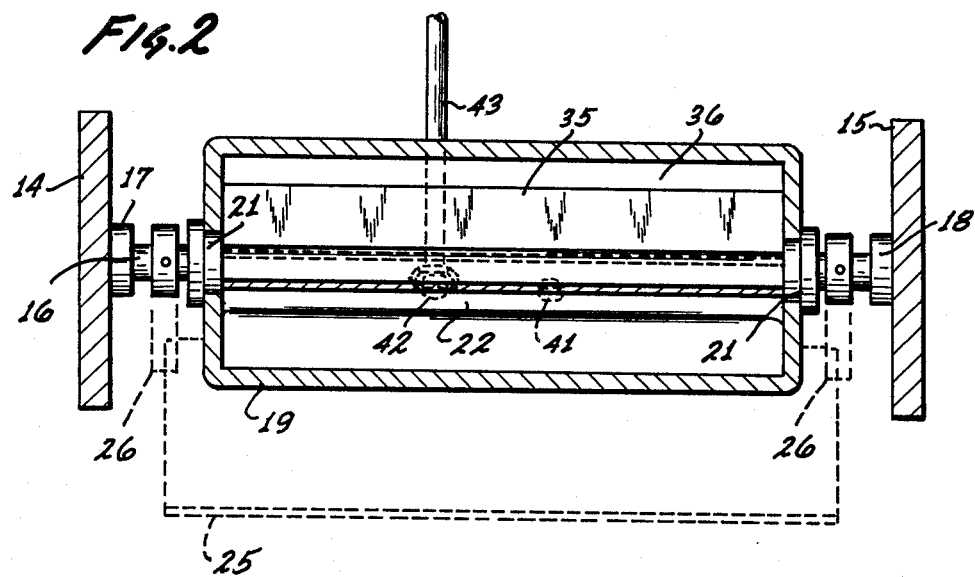
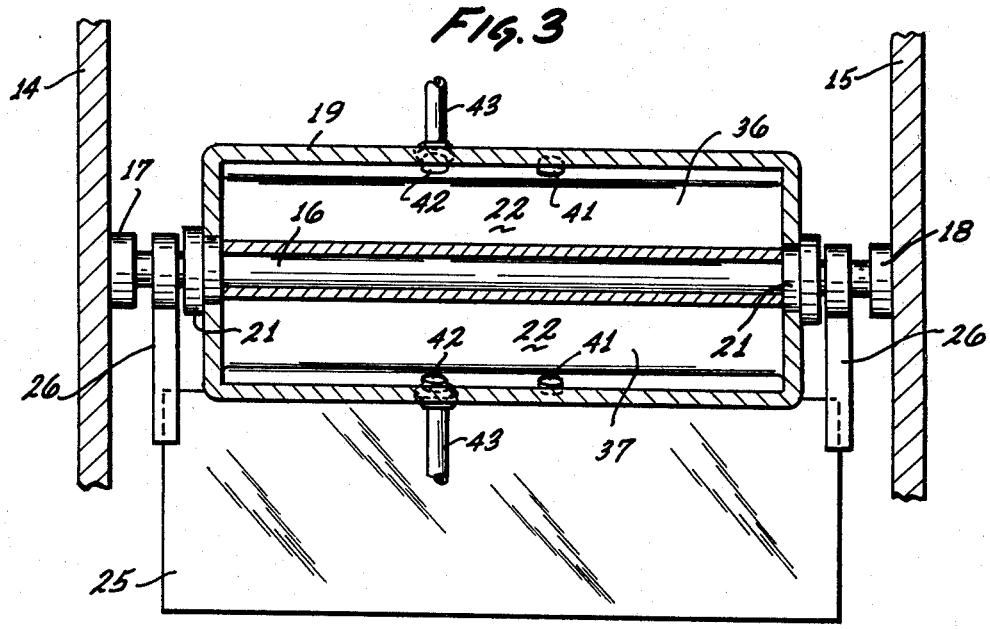
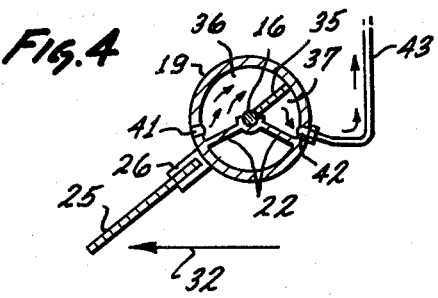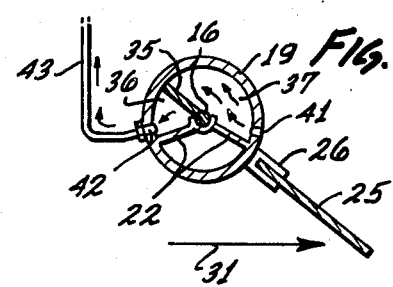

MOTOR POWERED BY WAVE ACTION

FIELD OF THE INVENTION

This invention relates to the art of converting water energy to other types of useful energies and, more particularly, to extracting useful energy from wave action.

BACKGROUND OF THE INVENTION

Everyone knows that a relatively large amount of energy is expended in the ocean's surf. The waves cause an oscillating flow of water to strike the beach. Thus, each time a wave comes in, water is washed upon the beach which flows back, due to gravity, between waves. This oscillating motion of the water is also found in relatively shallow water away from the shoreline, generally termed undertows.

In the past, many types of devices have been developed to extract energy from wave action. One such device is disclosed in U.S. Pat. No. 1,338,326. Briefly, the device taught therein consists of a basin, provided with means for receiving water, in which basin a supply of water is maintained by wave action at a higher level than the normal water level, a water wheel, and means for varying the buoyancy of the rotating part of the water wheel so as to reduce the friction thereof. This device, although being capable of extracting energy from waves, requires a large capital expenditure and detracts from the aesthetic value of the seashore.

Other devices have been developed to extract energy from water energy in an ocean. These other devices can only extract energy when water moves in one direction.

OBJECTS OF THE INVENTION

An object of this invention is to provide a device which can be readily installed offshore in relatively shallow water and which is activated by the oscillating motion of the waves.

Another object of this invention is to provide a water paddle and pumping apparatus that responds to the offshore wave action.

Accordingly, one aspect of the invention consists of a drum-type sea water pump fixedly disposed submerged offshore with the axis of the drum in the horizontal position, and also parallel to the shore. The drum has a rotatable axially disposed shaft to which is coupled a paddle that depends therefrom to the ocean floor. Within the drum there is a stationary radial vane fixed to the drum and a rotating radial vane fixed to the shaft so that as the shaft oscillates, water is capable of being pumped.

These and other objects and features of advantage will become more apparent after studying the following detailed description of my preferred embodiment of the invention, together with the appended drawings.

BRIEF DESCRIPTION OF THE DRAWINGS

FIG. 2 is a vertical section taken on line 2—2 of FIG. 1 in the direction of the arrows.

FIG. 3 is a horizontal section taken on line 2—2 of FIG. 1 in the direction of the arrows.

FIG. 4 is a schematic showing pumping action in one direction.

FIG. 5 is a schematic showing the pumping action in the other direction.

DETAILED DESCRIPTION OF THE DRAWINGS

Figure 1:
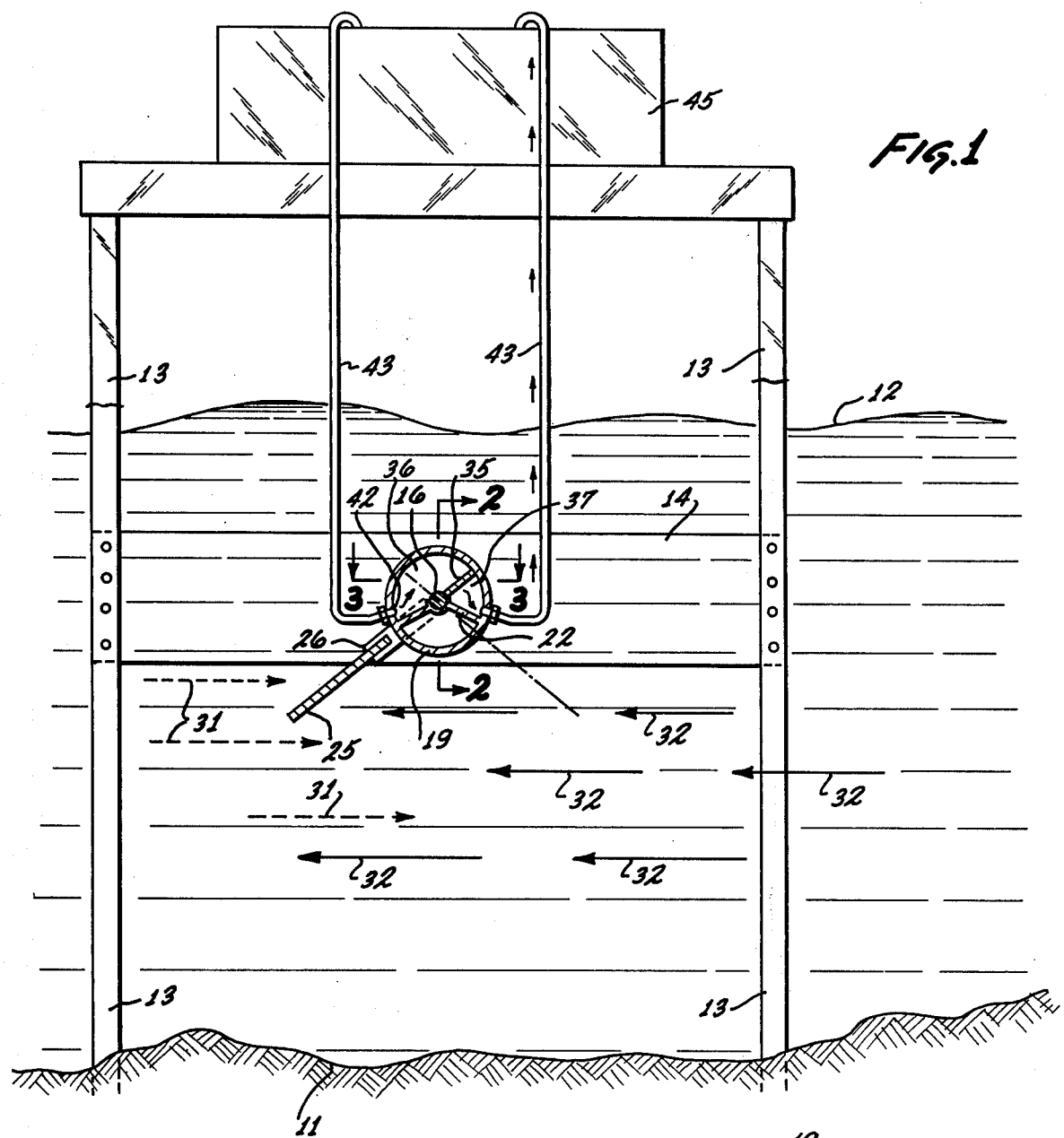
FIG. 1 is a vertical section of the novel wave-activated pump or motor.

Referring to FIG. 1 there is shown a cross-section through the shallow water portion of the ocean near a shoreline. Item 11 is the ocean floor and rises to the right to the beach shoreline and drops to the left to the ocean. Item 12 represents the surface with the waves thereon. Actually, the waves are moving to the right towards the beach. The waves have crests and troughs. Fixed to the ocean floor 11 is a frame made of four columns 13 of which two, closest to the viewer, have been broken away near the top for clarity. Across two columns 13 which are aligned perpendicular to the shoreline is placed a support plate 14, while another support plate 15 (FIG. 2) is placed across the other two columns. The plates 14 and 15 are aligned horizontally to each other so that a shaft 16 may be bearing supported horizontally by the plates. Suitable bearings 17 and 18 are provided on the plates 14 and 15, respectively. The shaft 16 extends through apertured end walls in a housing 19 which has, at each end, a suitable bearing and water seal 21 and through which the shaft 16 rides and seals out the water. Interior of the housing 19 are, for example, two fixed radially disposed vanes 22 which are shown joined near the axis to form a bearing and sealing surface for shaft 16. The function of these vanes 22 will become more apparent hereinafter.

Extending radially from shaft 16 exterior of the housing 19 is a water paddle 25 supported by two arms 26 fixedly mounted to shaft 16. The paddle 25 depends from the shaft 16. The waves inherently cause the sea water to first move towards the shore, as shown by broken arrows 31 (FIG. 1), and then move away from the shore, as shown by arrows 32. The concensus of opinion among experts in oceanography is that if the crest of the wave is approaching above the point in question, for example, the shaft 16, the flow of water would be towards the shore, and if the crest has passed the flow would be the other way, or in the direction pointed by arrows 32. Thus, one can see that the paddle would oscillate left and right due to the wave action. This oscillating motion of the paddle is preferably used to lift water so that the elevated water could be converted to useful work.

Figure 1A:
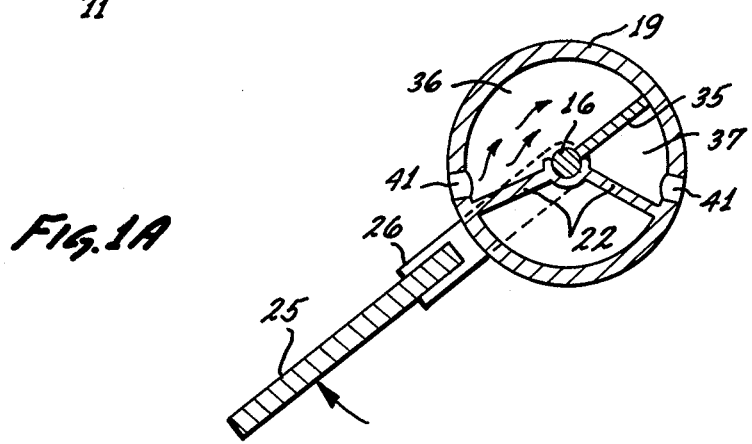
FIG. 1A is an enlarged section through the pump of FIG. 1.

As used herein, the term "motor" is taken in its broad sense, i.e., a device that converts energy from one form to another. Therefore, as shown herein, the motor is a water pump and the water pump consists of the housing 19 and, mounted to the shaft 16, a radially oscillating vane 35. The vane 35 is preferably aligned with the paddle 25, preferably on the opposite side of the shaft 16 from paddle 25. The vane 35 extends the full length of the housing and a suitable seal is provided between the vane 35 and the interior surface of the housing 19. For clarity, vane 35 is not shown in FIG. 3. When the wave action causes the paddle 25 to oscillate, the shaft 16 is also made to oscillate, but torsionally about the axis so that the vane 35 also torsionally oscillates about the axis. This causes the compartments 36 and 37 (more clearly shown in FIG. 1A), formed on opposite sides of the vane 35, to alternately increase and decrease in volume. Near both respective stationary vanes 22 are disposed a one-way inlet valve 41 and a one-way outlet valve 42 (schematically shown in FIG. 3). The outlet valves 42 are coupled to a standpipe 43 so that sea water drawn through an inlet valve is forced up the standpipe to a storage tank which is, for example, supported by the four columns 13. The water in the tank 45 can now be coupled to the shore to power, for example, a water turbine for an electric generator.

The pumping action can best be described by referring to FIGS. 4 and 5. FIG. 4 shows the paddle being moved to the left by the wave action, which causes the vane 35 to move to the right around shaft 16. In so doing, water is drawing through valve 41 into compartment 36 and out valve 42 from compartment 47 and up standpipe 43. Referring to FIG. 5, when the paddle is moved in the other direction, to the right, the vane 35 now causes water to flow into the valve 41 of compartment 37 and causes water to flow out of compartment 36 through valve 42 into the standpipe 43.

Having described the preferred embodiment of my invention, one skilled in the art, after reading the above description, can devise other embodiments falling within the spirit of my invention. Therefore, my invention is not to be considered limited to the enclosed embodiment, but includes all embodiments falling within the scope of the appended claims.

I claim:

1. A motor activiated by ocean wave action comprising:
   a shaft disposed on a subsantially horizontal axis which is substantially parallel to the wave action;
   a water paddle radially disposed from said shaft and to rotate about the axis so that any wave action in said ocean causes said paddle to tortionally oscillate about said axis;
   means for converting the oscillating motion of said paddle to useful work, said means comprising:
   a cylindrical housing with annular end caps:
   said shaft protruding through said annular end caps;
   a radially disposed fixed vane in said housing;
   a radially disposed oscillating vane mounted within said housing and onto said shaft, to divide said housing into two compartments:
   an inlet valve and an outlet valve formed through the wall of said housing to communicate with respective ones of said compartments; and
   a standpipe coupled to each outlet valve to deliver water to a place of use.

2. The motor of claim 1 wherein:
   said shaft is bearing mounted at each end;
   arms are provided, one at each end of said housing, and fixed to said shaft; and
   said paddle is mounted to said arms.

3. The motor of claim 2 wherein said paddle is disposed to depend from said shaft.

4. A motor activated by ocean wave action comprising:
   a shaft disposed on a substantially horizontal axis which is substantially parallel to the wave action;
   a water paddle radially disposed from said shaft and to rotate about the axis so that any wave action in said ocean causes said paddle to tortionally oscillate about said axis;
   means for converting the oscillating motion of said paddle to useful work;
   said axis being submerged below the surface of the ocean:
   said means comprising:
   a cylindrical housing with annular end caps;
   said shaft protruding through said annular end caps;
   a radially disposed fixed vane in said housing;
   a radially disposed oscillating vane mounted within said housing and onto said shaft, to divide said housing into two compartments:
   an inlet valve and an outlet valve formed through the wall of said housing to communicate with respective ones of said compartments; and
   a standpipe coupled to each outlet valve to deliver water to a place of use.

5. The motor of claim 4 wherein:
   said shaft is bearing mounted at each end;
   arms are provided, one at each end of said housing, and fixed to said shaft; and
   said paddle is mounted to said arms.

6. The motor of claim 5 wherein said paddle is disposed to depend from said shaft.

* * * * *